US 6,442,458 B2

(12) United States Patent
Kubo et al.

(10) Patent No.: US 6,442,458 B2
(45) Date of Patent: Aug. 27, 2002

(54) METHOD AND APPARATUS FOR DIAGNOSING A VEHICLE

(75) Inventors: Hiroshi Kubo; Yuzuru Koike; Masato Kodani, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/728,490

(22) Filed: Dec. 4, 2000

(30) Foreign Application Priority Data

Dec. 9, 1999 (JP) .......................................... 11-350570

(51) Int. Cl.$^7$ .......................... G01M 17/00; G06F 7/00; G06F 19/00
(52) U.S. Cl. .............................. 701/29; 701/30; 701/31; 701/33; 701/34; 701/35; 701/101; 340/426; 340/438; 340/425.5; 340/459; 123/520; 123/198 D; 123/295; 123/305; 73/118.1; 73/23.32; 60/277
(58) Field of Search ............................. 701/29, 101, 31, 701/34, 33, 35, 30; 340/426, 438, 459, 425.5; 123/295, 305, 479, 90.15, 90.17, 198 D, 90.31, 520; 73/118.1, 23.32; 60/277

(56) References Cited

U.S. PATENT DOCUMENTS

| | | | | |
|---|---|---|---|---|
| 4,274,739 A | * | 6/1981 | Grubbs et al. ................ 33/288 |
| 4,644,266 A | * | 2/1987 | Reuter ........................ 324/73.1 |
| 4,809,177 A | * | 2/1989 | Windle et al. ................ 180/170 |
| 5,058,443 A | * | 10/1991 | Riedmaier .................. 73/865.9 |
| 5,450,321 A | * | 9/1995 | Crane ........................ 307/10.6 |
| 5,899,284 A | * | 5/1999 | Reimers et al. ............... 180/11 |
| 5,974,857 A | * | 11/1999 | Yamashita et al. .......... 73/23.32 |
| 6,138,638 A | * | 10/2000 | Morikawa .................... 123/295 |
| 6,164,125 A | * | 12/2000 | Kawase et al. ................ 60/277 |
| 6,218,952 B1 | * | 4/2001 | Borland et al. ............. 340/641 |
| 6,282,464 B1 | * | 8/2001 | Obradovich ................ 340/988 |
| 6,285,931 B1 | * | 9/2001 | Hattori et al. ............... 340/426 |

FOREIGN PATENT DOCUMENTS

| JP | 61-98639 | 5/1986 |
|---|---|---|
| JP | 3-31041 | 2/1991 |

\* cited by examiner

Primary Examiner—Yonel Beaulieu
Assistant Examiner—Ronnie Mancho
(74) Attorney, Agent, or Firm—Arent Fox Kintner Plotkin & Kahn, PLLC (57) ABSTRACT

A diagnostic apparatus for a vehicle can display diagnostic results and an indication of whether or not the diagnosis has been completed with a single display device. The diagnostic apparatus adapted to be mounted on the vehicle for diagnosing the vehicle based on driving condition parameters of the vehicle includes a display device or an indicator for indicating presence or absence of malfunction based on the diagnostic results, means for switching the diagnostic apparatus into a notification mode in response to a predetermined operation state, and a display control unit for displaying on the display device the indication of whether or not the diagnosis has been completed in response to being switched into the notification mode. The indication of whether or not the diagnosis has been uncompleted can be displayed on the display device by switching into a notification mode in response to the predetermined operation status. The display device may be a lamp provided near a driver's seat in the vehicle, and the indication of whether or not the diagnosis has been completed may be effected by blinking the lamp.

11 Claims, 10 Drawing Sheets

| | | Second counter | First counter | Initial process flag |
|---|---|---|---|---|
| First time operation | Initial process (1) | 0 | 0 | 1 |
| | First time process | 1 | 0 | 1 |
| | Flag OFF→ON | 1 | 0 | 0 |
| Second time operation | Initial process (2) | 0 | 1 | 1 |
| | M-L burn-out process (1) | 2 | 2 | 1 |
| | Second and subsequent time process (1) | 2 | 2 | 1 |
| | Flag OFF→ON | 2 | 0 | 0 |
| Third time operation | Initial process (3) | 0 | 2 | 1 |
| | M-L burn-out process (2) | 3 | 3 | 1 |
| | Second and subsequent time process (2) | 3 | 3 | 1 |
| | Flag OFF→ON | 3 | 0 | 0 |
| C function operation | Initial process (4) | 0 | 3 | 1 |
| | M-L burn-out process (3) | 4 | 4 | 1 |
| | Condition holding process | | | |
| | Execution of M-L C function | 4 | 4 | 1 |

METHOD AND APPARATUS FOR DIAGNOSING A VEHICLE

FIELD OF THE INVENTION

The present invention relates to a diagnostic apparatus for diagnosing a vehicle for presence of any abnormality based on the driving condition parameters of various portions of an engine system, which are input to an electronic control unit of the vehicle.

DESCRIPTION OF RELATED ART

In recent years, a vehicle engine system has been controlled using an electronic control unit (ECU). Specifically, the ECU receives signals from sensors provided at various portions of the engine system, and performs an computation based on the thus received data to control the ignition timing, the fuel injection quantity or the like.

In such an electronic control system, a self-diagnostic function for detecting an abnormal part of the engine system and informing a driver or a mechanic of an abnormality is usually incorporated. Diagnostic results of the ECU is typically stored in an EEPROM which is a writable non-volatile memory as described in Japanese Patent Laid-Open No. 61-98639. Another means for storing the self-diagnostic results is aback-up RAM (random access memory), which is less expensive than the EEPROM, as described in Japanese Patent Laid-Open No. 3-31041. The back-up RAM is supplied with a maintaining current from a battery of the vehicle even when the power of the system is turned off, and the stored data is maintained. That is, the back-up RAM is used as if it were a non-volatile memory by maintaining the power supply to the RAM. The back-up RAM loses the contents when the battery is removed from the vehicle, as may occur when replacing the batteries.

For example, when a battery is replaced in the car examination and maintenance, the diagnostic data stored in the back-up RAM is lost. This raises a problem when a car examination party tries to inspect the diagnostic data or check whether or not the self-diagnostic function is normal.

A diagnostic apparatus as described in Japanese Patent Laid-Open No. 3-31041 has two lamps, a code display lamp for blinking a trouble code designating an abnormality detected by the diagnosis, and a warning lamp which is lighted when the back-up data is broken and the diagnosis is uncompleted. If a user knows that the diagnosis is uncompleted as indicated by the warning lamp, the user can complete the diagnosis by running the vehicle for the period or distance required for the system to complete the diagnosis.

SUMMARY OF THE INVENTION

The present invention has been achieved in the light of such demand, and it is an object of the invention to effect the display of the diagnostic results and an indication of whether or not the diagnosis has been completed using a single display device or an indicator.

The information displayed on a driving panel of the vehicle or near a driver's seat includes the vehicle speed, engine speed, fuel amount, seat belt warning, door warning, rear window heater warning, and the parameters regarding the air conditioning, the car audio, and the car navigation. The meters and displays are too complicated for ordinary drivers. Accordingly, it is desired that the number of warning lamps near the driver's seat be suppressed or decreased.

According to one aspect of the invention, a diagnostic apparatus to be mounted on a vehicle is provided for diagnosing the vehicle based on the driving condition parameters of the vehicle. The diagnostic apparatus comprises: a display for displaying the presence or absence of an abnormality based on the diagnostic results; a switch for switching the diagnostic apparatus into a notification mode in response to a predetermined operation state; and a display controller, responsive to being switched into the notification mode, for displaying on the display whether or not the diagnosis has been completed. The operation state refers to a state where a user has or has not performed a specific operation.

According to the invention, an indication of whether or not the diagnosis has not been completed can be displayed on a display device or an indicator for indicating the diagnostic results by switching the mode of the diagnostic apparatus into the notification mode in response to a predetermined operation state.

According to another aspect of the invention, in the above mentioned diagnostic apparatus, the display is a lamp provided near a driver's seat of the vehicle, and the indication of whether or not the diagnosis has been completed can be effected by blinking the lamp.

According to another aspect of the invention, one lamp is used as the display to effect the display of the diagnostic results and the indication of whether or not the diagnosis has been completed.

According to further another aspect of the invention, the predetermined operation state is a state of an ignition switch.

According to one embodiment of the invention, the diagnostic apparatus is switched into the notification mode in accordance with the predetermined operation state of the ignition switch. The apparatus according to the invention can be built by programming a conventional apparatus without substantially changing a hardware.

Further, according to another aspect of the invention, the display controller indicates an undiagnosed portion by a blinking pattern of the lamp. Since the undiagnosed portion is indicated in the blinking pattern of the lamp, a driver or a mechanic can learn the undiagnosed portion and can take a measure correspondingly.

According to yet another embodiment of the invention, the notification mode is released by starting the engine. The releasing function can be incorporated into to the diagnostic apparatus by programming without requiring a separate releasing device.

BRIEF DESCRIPTION OF THE DRAWINGS

FIG. 10 is a table showing the states of a first counter, a second counter, and an initial process flag.

DETAILED DESCRIPTION OF THE PREFERRED EMBODIMENTS

Figure 1:
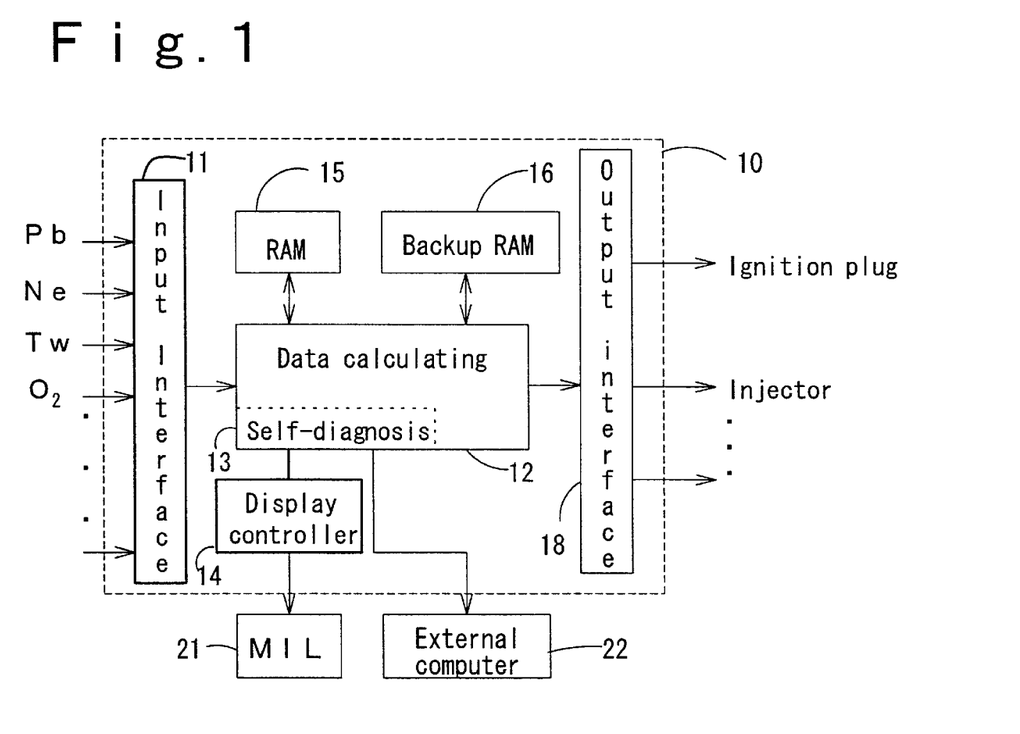
FIG. 1 is an overall functional block diagram of an electronic control unit which realizes a diagnostic apparatus according to one embodiment of the present invention.

A preferred embodiment of the present invention will be described below with reference to the drawings. FIG. 1 is a functional block diagram showing the overall configuration of an electronic control unit 10 according to one embodiment of this invention. The electronic control unit 10 here is a unit for controlling an engine system, and has a diagnostic apparatus incorporated. Particularly, the electronic control unit 10 comprises a processor (Central Process Unit, CPU), a random access memory (RAM) for providing a working area for the processor and a temporary storage area for data, a read-only memory (ROM) for storing a program to be executed by the processor and the preset data regarding various kinds of parameters, a non-volatile memory or a back-up RAM for storing the computation results by the processor to be used later, an input interface for process and digitizing data signals from various portions of the vehicle, and an output interface for sending driving or activating signals to various portions of the engine.

FIG. 1 is a functional block diagram of the electronic control unit 10 with such a hardware configuration. A driving condition detecting portion 11 receives the signals from various portions of the engine system such as an output Pb from an intake manifold pressure sensor, an output Ne from an engine speed sensor, an output Tw from an engine water temperature sensor, and an output O2 from an exhaust system O2 sensor (air fuel ratio sensor). These signals are processed and digitized, and passed to a data computation portion 12.

The data computation portion 12 executes the computations, e.g., calculates the fuel injection time (fuel injection quantity) of a fuel injection device (injector) in accordance with a computer program stored in the ROM. The calculated value is passed to an output interface 18. The output interface 18 produces a signal for driving fuel injectors in accordance with the value passed from the data computation portion, and sends the signal to the injector. In this form, the electronic control unit controls the injectors, the ignition plugs, and other units. The RAM 11 serves as a working area when the data computation portion 12 performs operations.

The data computation portion 12 has a self-diagnostic portion 13, which executes a diagnostic program, once every 200 milli-seconds, for example, as the background operation with a lower priority than the control operation such as the fuel injection control. The diagnostic program itself is conventional, and automatically diagnoses each portion of the engine system as to whether or not each portion is normal, based on the data from each portion of the engine system which is input into the driving condition detecting portion 11.

The diagnostic results are stored in the background RAM 16, and updated every time the diagnosis is made. After an ignition key is turned off, and the electronic control unit 10 becomes non-active, the backup RAM 16 is supplied with a maintaining current flowing via a voltage control circuit from a car battery. A display control portion 14 displays the diagnostic results on a warning lamp, MIL (Malfunction Indicator Lamp) 21. There are various ways of displaying the results, including turning on the lamp for simply indicating that the engine system is abnormal. The lamp may blink with a specific pattern for indicating the abnormal part. These ways will be described later in detail.

The electronic control unit 10 has a terminal for connection to an external computer 22. The external computer 22 is preferably a handy portable personal computer, and is connected to the electronic control unit 10 at a service factory to present data stored in the backup RAM to a service staff. The service staff will learn the nature of abnormality based on the thus-obtained data, and fix the car.

Figure 2:
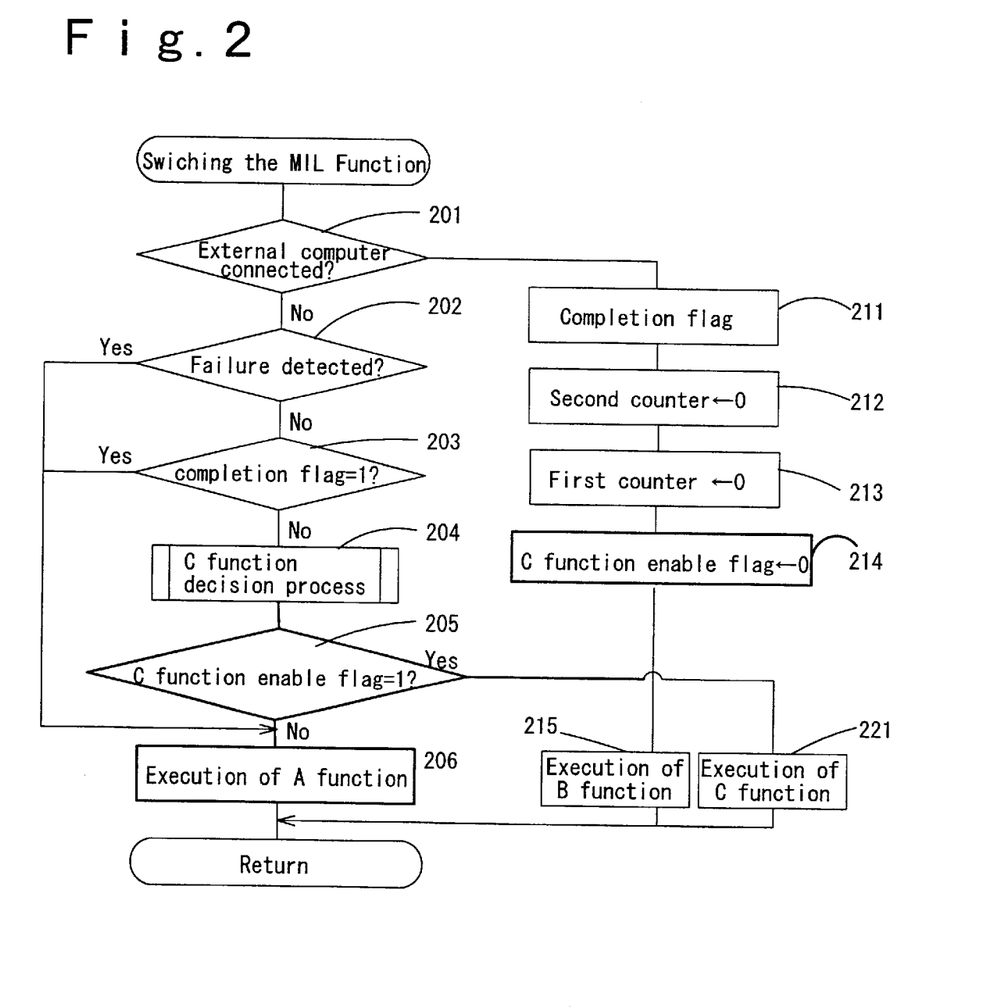
FIG. 2 is a flowchart showing a process flow of switching a MIL display function.

FIG. 2 is a flowchart showing a process for switching the display function of MIL 21. First, it is checked whether or not the external computer 22 is connected to the electronic control unit 10 (201). If not connected, it is checked whether or not a failure flag is set (202). If a failure is detected, the routine proceeds to block 206, where an A function for turning on an engine warning lamp (MIL) is executed. If no failure is detected, a completion flag is checked (203). If the completion flag is set, the routine proceeds to block 206. The completion flag is set to 1 when a C function decision process is completed.

If the completion flag is not set at step 203, the routine proceeds to step 204 to enter a C function decision process routine. Herein, the C function is a function for notifying a completion of practicing the failure diagnosis. The details of the C function decision process will be described later with reference to FIG. 3. In one embodiment, the process is started when the user operates an ignition switch in accordance with a specified procedure. If it is determined that the C function is executable in the C function decision process, the C function enable flag is set. If this flag is set, the process proceeds to execution of the C function (221). When the ignition switch is not operated in accordance with the specified procedure by the user and the C function decision process routine is not entered, the A function is executed without this step (206). Then the routine exits from the process.

If the external computer 22 is connected to the electronic control unit 10 at step 201, the completion flag is set (211). Then, a first counter and a second counter are reset (212, 213). The C function enable flag is reset (214). And the routine enters a process of executing a B function or providing a failure code to the external computer (215). The first and second counters are counters for use in the C function decision process of FIG. 3, and will be described below in detail.

Figure 3:
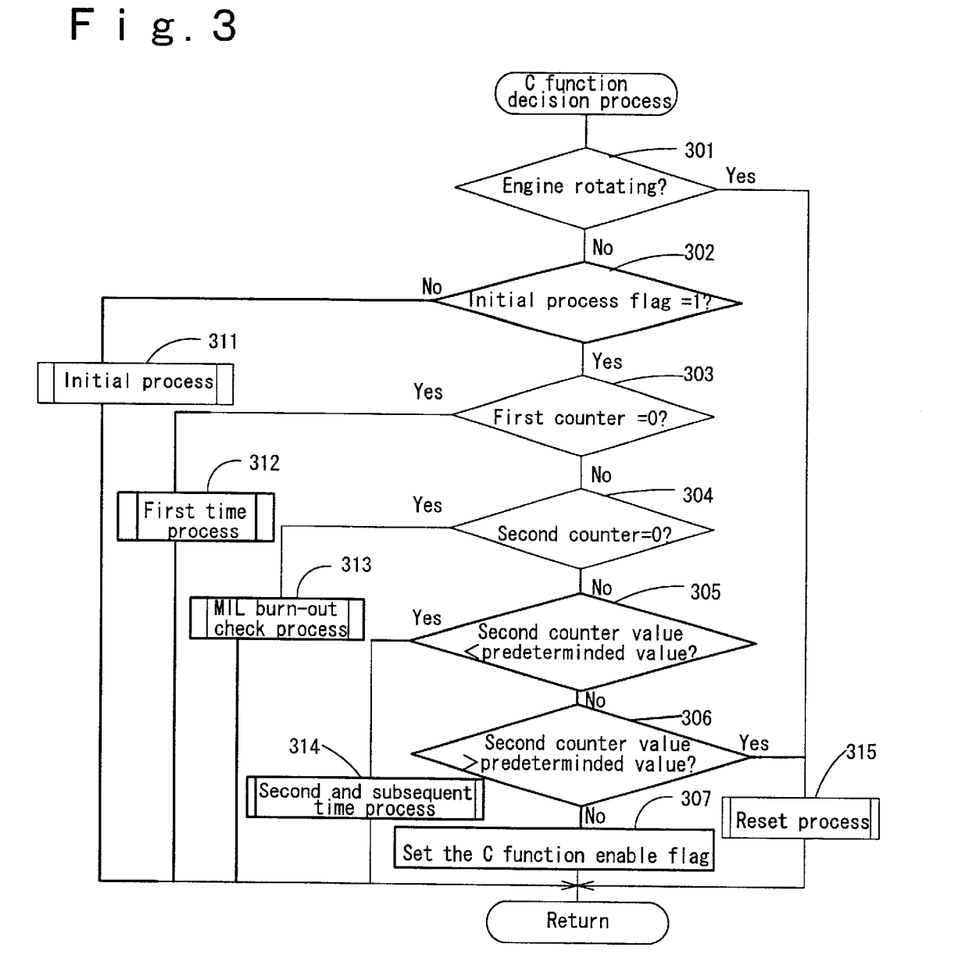
FIG. 3 is a flowchart showing a flow of a C function decision process.
Figure 4:
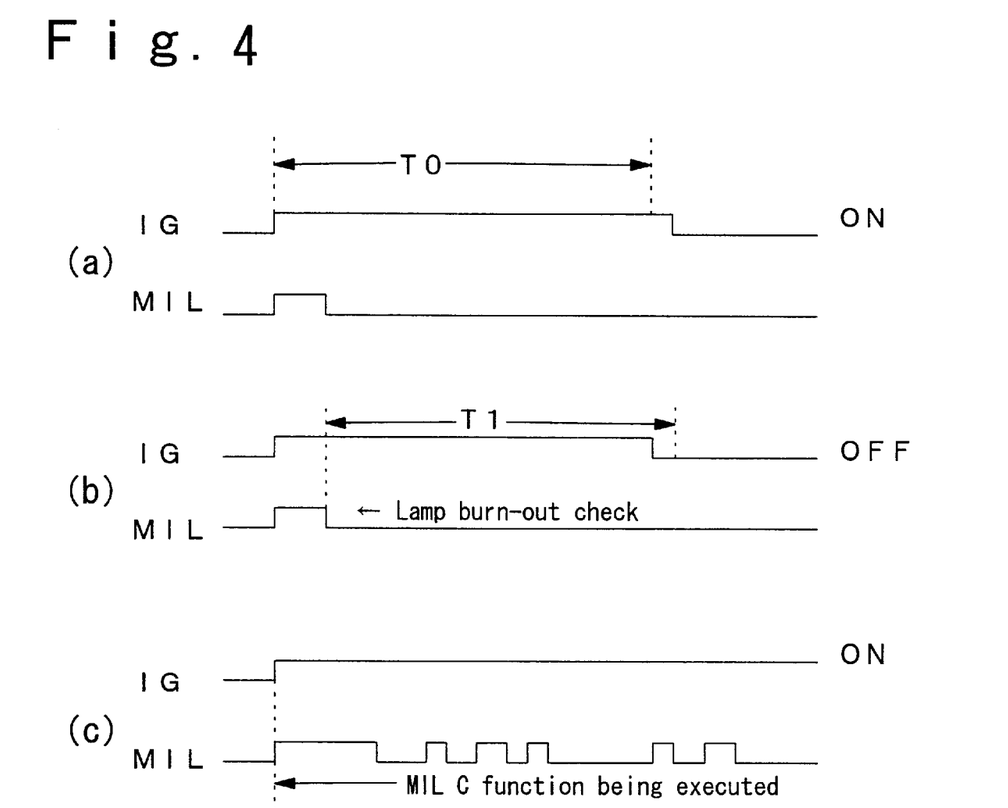
FIG. 4 is a diagram showing a relation between an operation of an ignition switch and a turning on of MIL, corresponding to FIG. 3.

FIG. 3 is a flowchart showing a process of one embodiment for determining the switching into the C function or the function of notifying the completion of diagnosis. FIG. 4 is a timing chart corresponding to this process. Referring first to FIG. 4(a), if the ignition switch is turned on, the warning lamp MIL is turned on for a short time, e.g., 2 seconds. When the user wants to know whether or not the electronic control unit 10 has completed the diagnosis based on a driving operation so far, that is, when the user wants to switch the MIL to the C function, the ignition switch needs to be kept on for longer than a predetermined time period T0, which may be preset to a value between 20 and 30 seconds, after which it needs to be turned off.

Subsequently, as shown in FIG. 4(b), the user turns on the ignition switch again. After turning on the MIL lamp for 2 seconds (lamp burn-out check), the ignition switch is turned off within a predetermined time T1, which is preset between 20 and 30 seconds. The operation of FIG. 4(b) is repeated a predetermined number of times, for example, twice.

As shown in FIG. 4(c), if the ignition switch is kept on, the MIL is lit for a fixed time that is sufficiently longer than the lighting period for lamp burn-out check. For example, the MIL is lit for 10 seconds to indicate that the MIL is switched into the C function. After this continuous lighting for the fixed time, the MIL blinks in a predetermined pattern indicating whether or not the diagnosis has been completed. This blinking pattern simply indicates that the diagnosis has been completed. For example, the lamp may blink three times at 2 second interval. In another embodiment, the blinking patterns include one that indicates an uncompleted diagnostic item, in addition to a pattern indicating completion of the diagnosis.

FIG. 3 shows a flowchart for executing the C function decision process in accordance with FIG. 4. When the engine is rotating (301), this process is not performed. First, a flag indicating that an initial process has been performed is checked (302). If the initial process flag is not 1, and the initial process has not been performed, an initial routine is entered (311).

Figure 6:
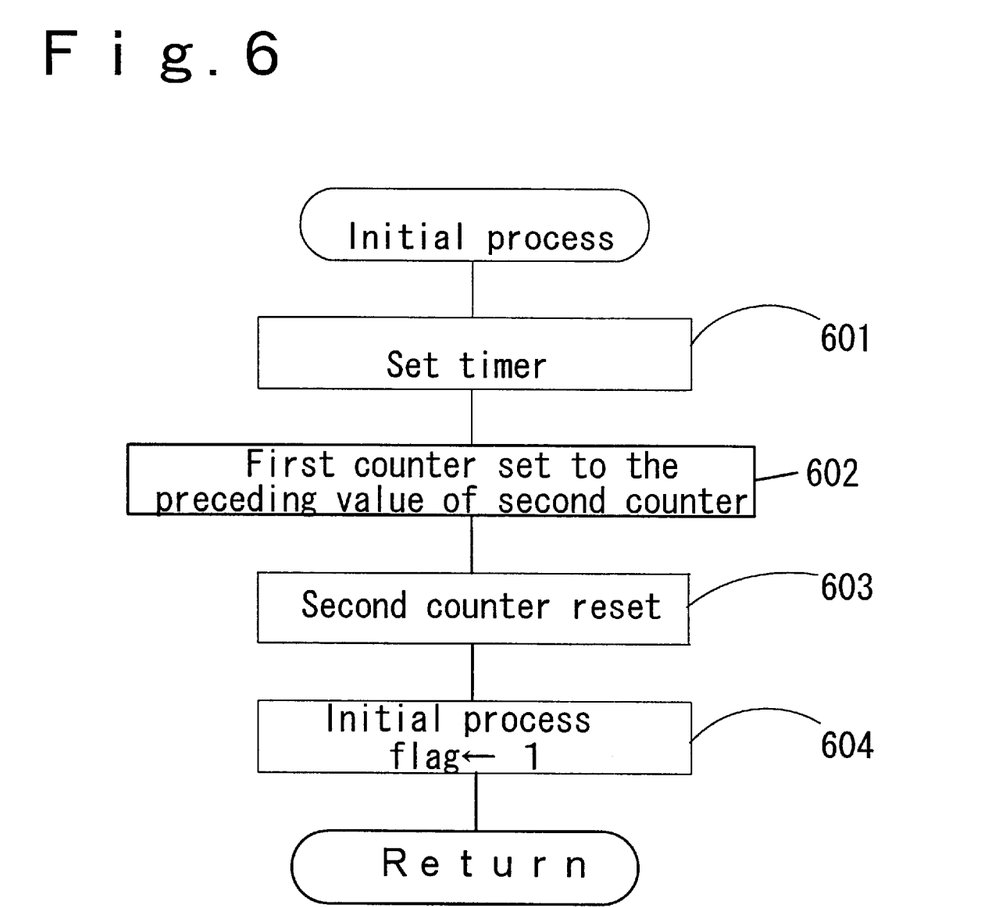
FIG. 6 is a flowchart showing the flow of an initial process.

The flow of the initial process is shown in flowchart of FIG. 6. A timer is set to T0, 30 seconds in this embodiment (601). A preceding value (initially 0) of the second counter is entered into the first counter (602), and the second counter is reset (603), followed by setting of an initial process flag (604).

The process of FIG. 3 is performed when the ignition switch is turned on. When the ignition switch is turned off, all the parameters temporarily stored in the RAM, except f or the parameters stored in the back-up RAM, will be lost. The count value of the second counter is stored in the back-up RAM, and is entered into the first counter in the initial process (311). With reference to FIG. 4($a$), the initial process flag is set to 1 at the first program execution cycle after the ignition switch is turned on and is reset when the ignition switch is turned off after T0 time elapsed.

In the program execution cycle after the initial process, the initial process flag is set to 1 until the ignition switch is turned off. Therefore, the routine proceeds to step 303, where it is checked whether the first counter is 0 or not. Since the first counter is at first equal to 0, a first time process routine is entered (312).

Figure 7:
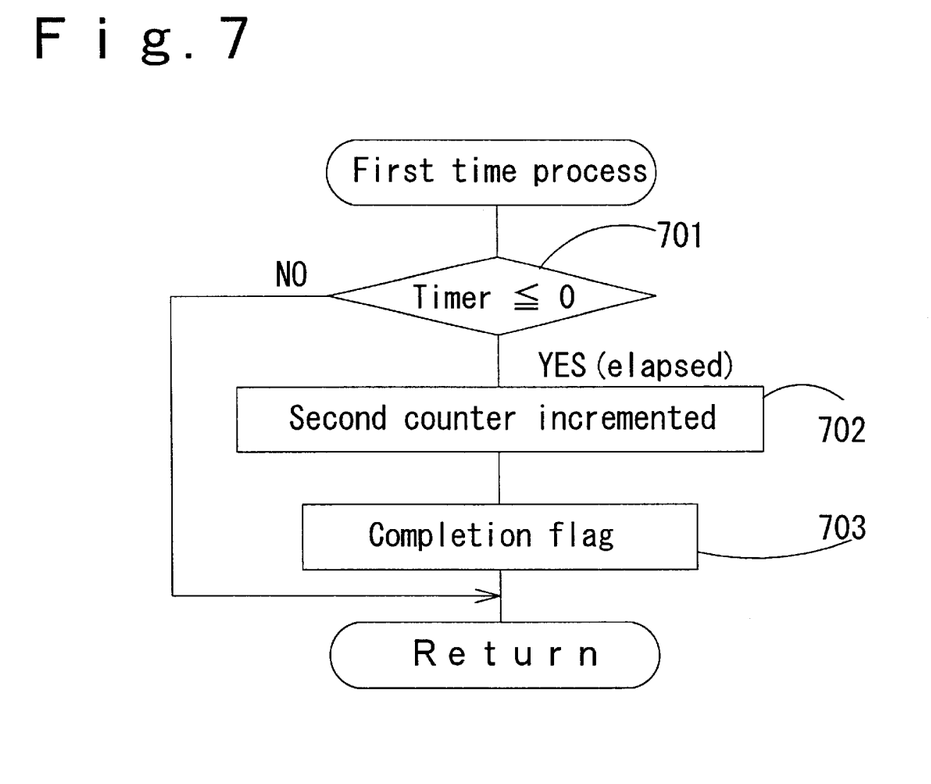
FIG. 7 is a flowchart showing the flow of a first time process.

A flow of the first time process routine is shown in FIG. 7. A down timer is checked to see whether or not the time set in the initial process has elapsed (701). If the time has not elapsed, this routine exits from this process. However, the routine passes through a block 303 in FIG. 3, and returns to a block 701 again. Thus, this process is repeated until the time T0 has elapsed. If the time T0 has elapsed, the second counter is incremented by 1 (702) and a completion flag is set (703) to exit from this routine. Through this process, it is detected that the ignition switch has been kept on for the time T0 or more. In this way, the process of FIG. 4($a$) is completed.

As shown in FIG. 4($a$), if the ignition switch is turned off after the elapse of the time T0, the value (i.e., 1 in this case) of the second counter is stored in the back-up RAM, as described previously, but the other parameters are reset.

As shown in FIG. 4($b$), when the ignition switch is turned on, the initial process 311 is entered again since the initial process flag has been reset. The timer is set (601), and the preceding value (i.e., 1 in this case) of the second counter that is stored in the back-up RAM is set to the first counter (602), followed by resetting of the second counter (603). The initial process flag is set (604) to exit from the initial process.

FIG. 10 shows how the first counter, the second counter and the initial process flag change in progress of the process. Now, the status is in the initial process 2 at the second time operation.

The process of FIG. 3 and other processes described in this specification are executed at every 200 milliseconds. When the initial process at the second time operation is completed, and the process of FIG. 3 is entered again, since the initial process flag has been set, the routine proceeds to block 303. Because the first counter has been set to 1 at block 602 of FIG. 6, the routine proceeds to block 304. Because the second counter has been reset to 0 at block 603 of FIG. 6, a MIL burn-out check process is entered (313).

Figure 8:
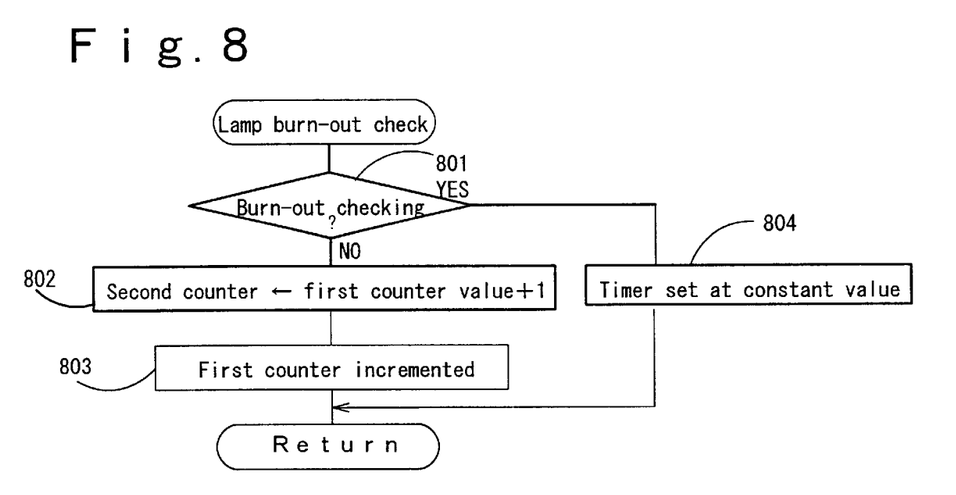
FIG. 8 is a flowchart showing the flow of a lamp burn-out check.

FIG. 8 is a flowchart showing the lamp burn-out check process, which corresponds to a portion indicated as the burn-out check in FIG. 4($b$). At block 801, it is checked in accordance with the conventional art whether or not the warning lamp MIL has been burnout. This check may be performed by simply inspecting whether or not electric current flows through the MIL. During the lamp burn-out check, the timer is set to time T1 (804).

When the lamp burn-out check has been completed, the routine proceeds to block 802. The value of the first counter plus 1 is set to the second counter. That is, in this case, the second counter is set to 2, followed by incrementing the first counter by 1 (803). The values of both the counters are now equal to 2 (see FIG. 10).

Again, when the process of FIG. 3 is entered, the process proceeds to block 305 because the initial process flag remains set, and each of the first counter and the second counter has a counter value of 2. Herein, it is checked whether or not the value of the second counter reaches a predetermined value, which is 4 in this embodiment. If not, a second or subsequent time process is entered (314).

Figure 9:
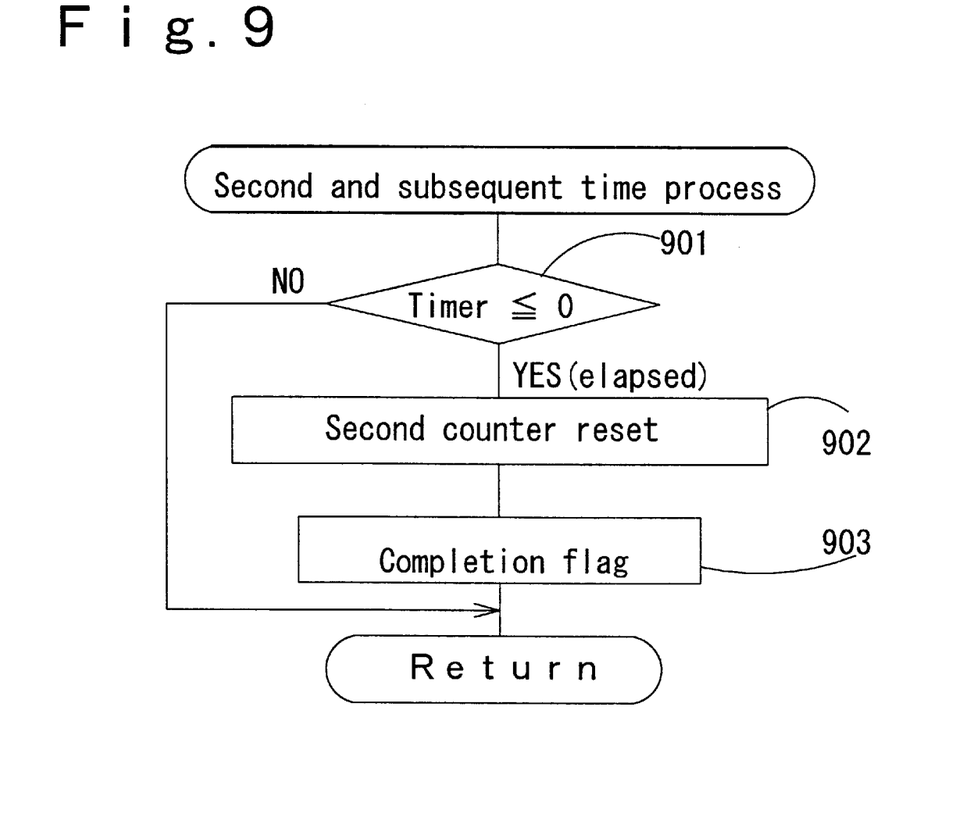
FIG. 9 is a flowchart showing the flow of a second and succeeding time process.

FIG. 9 is a flowchart showing the flow of the second time and a subsequent time process. By using a timer whether or not the time T1 set at block 804 of FIG. 8 has elapsed is checked (901). If not, the routine exits from the process. The routine returns to block 901 again at the next program execution cycle. Thus, if the time T1 has elapsed, the second counter is reset (902), and the completion flag is set (903). In this way, the elapse of the time T1 indicates that the ignition switch has not been turned off within the time T1 as shown in FIG. 4($b$). In this case, the C function decision process ends.

If the ignition switch is turned off within the time T1, all other parameters than the value of the second counter are reset. Accordingly, if the ignition switch is turned on, the process of FIG. 3 is started from the initial process (311) again. That is, the timer is set to T0 (this timer is reset to the time T1 later at block 804 of FIG. 8). The value (2 in this case) of the second counter stored in the back-up RAM is set to the first counter (602). The second counter is reset (603). The initial process flag is set to 1 (604). The status of the counter is as shown in the column of the initial process 3̂ at the third time operation of FIG. 10.

When the process of FIG. 3 is entered next time, the MIL burn-out check (313) at the second time is entered because the initial process flag has been set, the value of the first counter is 2, and the value of the second counter is 0. When the burn-out check is being done, the timer is set to the time T1 (804). When the burn-out check is completed, the second counter is set to a value of the first counter plus 1 (802) and the first counter is incremented to 3 (803) to exit from the process. The status of the counter is as shown in the column of the MIL burn-out process 2̂ at the third time operation in FIG. 10.

Again, when the routine enters the process of FIG. 3 and reaches a block 305, the value of the second counter has not reached a predetermined value 4. Therefore, the second time and subsequent time process (314) is entered. Thus, the routine waits for the ignition switch to be turned off within the time T1. When the ignition switch is turned off, the parameters except for the value of the second counter stored in the back-up RAM are reset. If the ignition switch is not turned off within the time T1, the routine exits from the C function decision process. That is, since the operation of FIG. 4(b) is not repeated a predetermined number of times (twice in this case), the C function decision process ends.

When the ignition switch is turned off within the time T1, the process of FIG. 3 ends, and the process of FIG. 3 is entered again at the next program execution cycle, the same process as the third time process is performed again from the initial process. At this fourth time process, the value of the second counter is set to 4 in the MIL burn-out check process (313). This status is shown in the MIL burn-out process 3 of the C function operation in FIG. 10.

Accordingly, in the process flow of FIG. 3, the determination at block 305 is NO. Then, the routine proceeds to block 306. The value of second counter is 4, and is not greater than the predetermined value 4. Therefore, the process proceeds to block 307, where the C function enable flag is set. In this way, the routine moves from block 205 to block 221 in the flowchart of FIG. 2, where the C function is executed.

At block 306, if the value of the second counter is greater than 4, it means that the C function decision process is malfunctioning. Therefore, all the parameters are reset (315) and the routine exits from the process. Also, if the ignition switch is moved to a starter position, and the engine is started, all the parameters used in the C function decision process, including the value of the second counter stored in the back-up RAM, are reset, and the C function process is released (315).

In an operation mode of the C function, i.e., a diagnosis completion notification mode, the content displayed with the MIL can be an alternative information indicating whether or not the diagnosis has been completed. As a result of diagnosis, the undiagnosed portion stored in the back-up RAM can be shown in a predetermined code pattern, and the MIL can blink in accordance with this code pattern. FIG. 4(c) shows an example of showing an undiagnosed portion by a blinking pattern.

The undiagnosed portion can be shown in terms of a section of the engine system, in which the engine system is divided into several large sections such as a catalytic system or a fuel tank system. By representing the undiagnosed portion with such a section, the user or the service staff can get an estimate of how long the vehicle needs to run so as to carry out diagnosis of the undiagnosed section.

In the above embodiment, the C function decision process, that is, the process of switching the system into a mode for notifying whether or not the diagnosis has been completed, is executed under the condition that the user operates the ignition switch several times. However, the C function decision process may be executed based on a simpler user operation.

Figure 5:
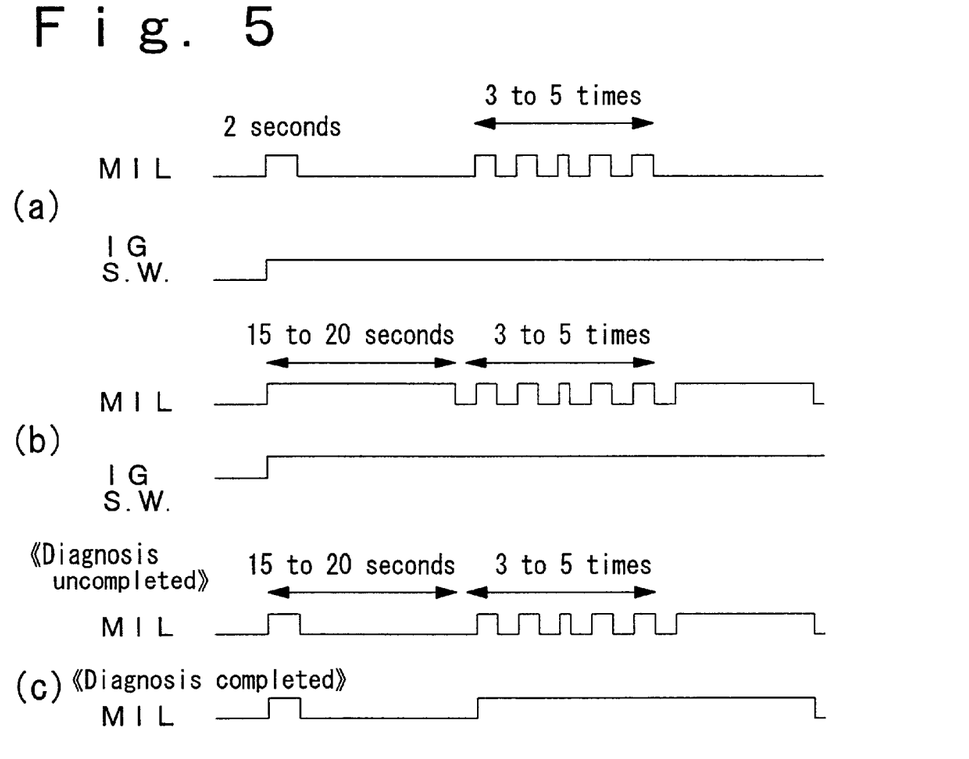
FIG. 5 is a diagram showing a diversity of MIL turning on forms.

For example, in response to the user turning on the ignition switch and keeping the ignition switch on over a predetermined time (e.g., 15 seconds) after the lamp burn-out check is done for a short time, a diagnosis notification mode may be entered as shown in FIG. 5(a). When the diagnosis is completed, the warning lamp MIL blinks several times (e.g., predetermined number of times from 3 to 5 times). If the diagnosis is not completed, the warning lamp is neither lit nor blinks after the lamp burn-out check. This operation is executed under the condition that the ignition switch is not at a position to turn on the starter. The relation between the completion of diagnosis and the turning on of MIL may be reversed from the above. That is, when the diagnosis is completed, the MIL is kept off without turning on or blinking the MIL. If the diagnosis is not completed, the MIL may be lit or may blink.

As shown in FIG. 5(b), the warning lamp MIL is lit in response to turning on the ignition switch. When the ignition switch is held on for a predetermined time (e.g., from 15 to 20 seconds), the diagnosis completion notification mode is entered. If the diagnosis is completed, the MIL blinks several times (e.g., predetermined number of times from 3 to 5 times). When the diagnosis is not completed, the lighting of the MIL is continued. In this case, the relation between the completion of diagnosis and the blinking of the MIL can be reversed.

Further, as shown in FIG. 5(c), in response to the switch being maintained at the ON position for a fixed time (e.g., from 15 to 20 seconds) after the ignition switch is turned on and the lamp burn-out check for the short time is executed, the diagnosis completion notification mode may be entered. When the diagnosis is not completed, the MIL blinks several times. When the diagnosis is completed, the MIL can be lit continuously.

According to the invention, the diagnostic apparatus is switched into the notification mode in response to a predetermined operation status, and an indication of whether or not the diagnosis has been uncompleted can be displayed on a display or an indicator for indicating the diagnostic results.

According to an embodiment of the invention, a single lamp is used as the display or the indicator to indicate diagnostic results and the indication of whether or not the diagnosis has been uncompleted.

According to another embodiment, the diagnostic apparatus enters the notification mode in accordance with the predetermined operation status of the ignition switch. The embodiments can be realized only by setting up a computer program without making substantial changes to the hardware.

According to further another embodiment, since the undiagnosed portion is indicated in a blinking pattern of the lamp, the operator can know the undiagnosed portion, and take a corresponding measure.

According to another embodiment, a function of indicating whether or not the diagnosis has been completed can be released by starting the engine.

While this invention has been described above with specific embodiments, this invention is not limited thereto.

What is claimed is:

1. A diagnostic apparatus adapted to be mounted on a vehicle, for diagnosing the vehicle based on driving condition parameters of the vehicle, comprising:

an indicator for indicating presence or absence of malfunction based on diagnostic results;

means for switching the diagnostic apparatus into a notification mode in response to a predetermined operation status; and a controller for indicating on said indicator an indication of whether or not a diagnosis has been completed in response to being switched into the notification mode.

2. The diagnostic apparatus according to claim 1, wherein the indicator is a lamp provided near a driver's seat in the vehicle, and the indication of whether or not the diagnosis has been completed is effected by blinking of the lamp.

3. The diagnostic apparatus according to claim 1, wherein the predetermined operation status is a status where an ignition switch has been operated.

4. The diagnostic apparatus according to claim 2, wherein the controller identifies an undiagnosed portion with a blinking pattern of the lamp.

5. The diagnostic apparatus according to claim 1, wherein the notification mode is released when the engine of the vehicle is started.

6. An electronic control unit (ECU) for a vehicle programmed to:

diagnose the vehicle based on driving condition parameters of the vehicle;

indicate on a display presence or absence of malfunction based on diagnostic results;

switch into a notification mode in response to a predetermined operation status; and indicate on the display an indication of whether or not a diagnosis has been completed in response to being switched into the notification mode.

7. The electronic control unit according to claim 6, wherein the display is a lamp provided near a driver's seat in the vehicle, and the indication of whether or not the diagnosis has been completed is effected by blinking of the lamp.

8. The diagnostic apparatus according to claim 6, wherein the predetermined operation status is a status where an ignition switch has been operated.

9. Method for indicating whether or not diagnosis of a vehicle has been completed, comprising:

diagnosing the vehicle based on driving condition parameters of the vehicle;

indicating on an indicator presence or absence of malfunction based on diagnostic results;

switching into a notification mode in response to a predetermined operation status; and displaying on the indicator an indication of whether or not a diagnosis has been completed in response to being switched into the notification mode.

10. The method according to claim 9, wherein the indicator is a lamp provided near a driver's seat in the vehicle, and the indication of whether or not the diagnosis has been completed is effected by blinking of the lamp.

11. The method according to claim 10, wherein the predetermined operation status is a status where an ignition switch has been operated.

* * * * *